United States Patent
Cromer et al.

(10) Patent No.: US 6,823,464 B2
(45) Date of Patent: Nov. 23, 2004

(54) METHOD OF PROVIDING ENHANCED SECURITY IN A REMOTELY MANAGED COMPUTER SYSTEM

(75) Inventors: Daryl Carvis Cromer, Apex, NC (US); Joseph Wayne Freeman, Raleigh, NC (US); Steven Dale Goodman, Raleigh, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 09/793,239

(22) Filed: Feb. 26, 2001

(65) Prior Publication Data

US 2002/0120845 A1 Aug. 29, 2002

(51) Int. Cl.[7] ................................................. G06F 1/24
(52) U.S. Cl. ................... 713/202; 7136/185; 7136/193; 7136/200; 7136/201
(58) Field of Search ............................... 713/185, 183, 713/193, 200, 201, 202

(56) References Cited

U.S. PATENT DOCUMENTS

| | | |
|---|---|---|
| 5,444,850 A | 8/1995 | Chang |
| 5,719,941 A | 2/1998 | Swift et al. |
| 5,757,920 A | 5/1998 | Misra et al. |
| 5,859,911 A | 1/1999 | Angelo et al. |
| 5,940,508 A | 8/1999 | Long et al. |
| 5,944,821 A | 8/1999 | Angelo |
| 5,953,422 A | 9/1999 | Angelo et al. |
| 5,963,142 A | 10/1999 | Zinsky et al. |

*Primary Examiner*—Thomas R. Peeso
(74) *Attorney, Agent, or Firm*—George E. Grosser; Dillon & Yudell LLP

(57) ABSTRACT

Authentication of an entity remotely managing a data processing system is enabled to allow changes by the remote entity to hard-locked critical security information normally accessible only during the POST and only to trusted entities such as the system BIOS. The remote entity builds a change request and generates a hash from the change request with a current password appended. The change request and the hash are stored in a lockable non-volatile buffer which, once locked, requires a system reset to access. During the next POST, a trusted entity such as the system BIOS reads the change request, generates an authentication hash from the change request and the current password within the hard-locked security information, and compares the buffered hash with the generated hash. If a match is determined, the security information is updated; otherwise a tamper error is reported.

21 Claims, 2 Drawing Sheets

METHOD OF PROVIDING ENHANCED SECURITY IN A REMOTELY MANAGED COMPUTER SYSTEM

BACKGROUND OF THE INVENTION

1. Technical Field

The present invention generally relates to remote management of data processing systems and in particular to remote management extending to "hard-locked" security information for a data processing system. Still more particularly, the present invention relates to permitting a remote entity to change "hard-locked" security data after correct authentication without compromising security.

2. Description of the Related Art

Critical security information, including passwords, boot sequences, security options, and the like, are frequently kept within a data processing system in a nonvolatile storage device which can be locked down "hard" (i.e., requiring a reset to unlock) prior to the operating system load, thereby effectively hiding the information during operation of the data processing system to prevent unauthorized access to this information. The information is therefore accessible only during startup of the data processing system (i.e., the "pre-boot" environment), and usually is only available to selected, trusted routines within the power on self test (POST) basic input/output system (BIOS). The information is not accessible at run time or anytime after the operating system begins loading, which protects the information from an unauthorized attack (e.g., a virus).

However, this treatment of the security information also prevents remote access by authorized users since there exists no completely secure method to identify the authorized user or to restrict access to the security information to only an authorized user. For complete remote manageability of a data processing system, remote access to the security data, including the ability to change the security data, is required. Currently, the only way to allow such remote access to the security data is to leave the data unprotected and allow configuration utilities to access the security information after booting of the operating system. The data processing system user is thus required to choose between a highly secure system with local maintenance or a remote maintenance strategy with less security.

It would be desirable, therefore, to permit remote access of critical information for the purpose of remote maintenance without compromising the security of such information, and to allow a remote entity to change the security data upon correct authentication.

SUMMARY OF THE INVENTION

It is therefore one object of the present invention to provide improved remote management of data processing systems.

It is another object of the present invention to provide remote management of data processing systems extending to "hard-locked" security information for a data processing system.

It is yet another object of the present invention to provide a mechanism permitting a remote entity to change "hard-locked" security data after correct authentication without compromising security.

The foregoing objects are achieved as is now described. Authentication of an entity remotely managing a data processing system is enabled to allow changes by the remote entity to hard-locked critical security information normally accessible only during the POST and only to trusted entities such as the system BIOS. The remote entity builds a change request and generates a hash from the change request with a current password appended. The change request and the hash are stored in a lockable non-volatile buffer which, once locked, requires a system reset to access. During the next POST, a trusted entity such as the system BIOS reads the change request, generates an authentication hash from the change request and the current password within the hard-locked security information, and compares the buffered hash with the generated hash. If a match is determined, the security information is updated; otherwise a tamper error is reported.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
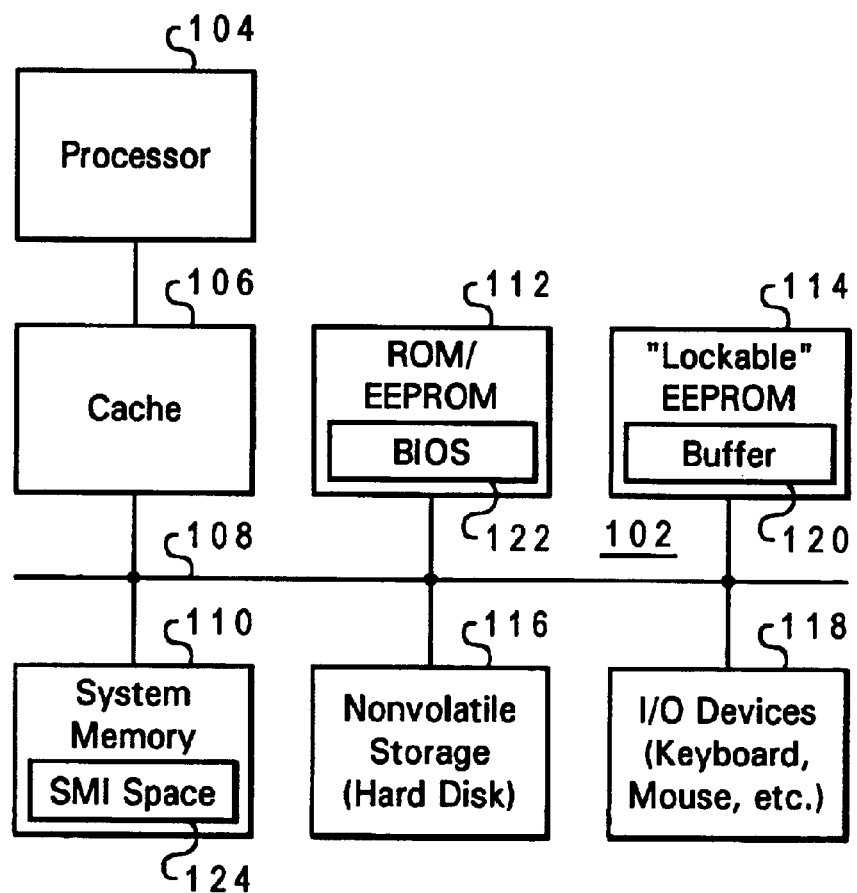
FIG. 1 depicts a high-level block diagram of a data processing system in which a preferred embodiment of the present invention is implemented.

With reference now to the figures, and in particular with reference to FIG. 1, a high-level block diagram of a data processing system in which a preferred embodiment of the present invention is implemented is depicted. Data processing system 102 includes a processor 104 coupled via a cache 106 to a system bus 108. Connected to the system bus 108 are various conventional memory devices including a system memory 110, typically a random access memory, and a set of nonvolatile read-only memory (ROM) and/or erasable, electrically programmable read only memory (EEPROM) devices 112. In the present invention, data processing system 102 also includes a "lockable" EEPROM device 114 which may be locked down hard, requiring a reset to unlock, during the power on sequence before the operating system is started. The lockable EEPROM device 114 contains critical security information as described above.

Also attached to system bus 108 are nonvolatile storage 116 such as a hard disk drive and a set of user input/output (I/O) devices 118, which would typically include a keyboard and a mouse or other cursor-control ("pointing") device. Other storage media, such as a CR-ROM or DVD drive, floppy disk drive, and the like may also be employed within data processing system 102, together with other user I/O devices such as a microphone, speakers/headphones, and the like.

The structure and operation of data processing system 102 is well known in the relevant art, and only so much of the structure and operation of data processing system as is unique to the present invention and/or required for an understanding of the present invention will be described herein. Lockable EEPROM device 114 includes a nonvolatile storage buffer 120 which is not locked down with the remainder of EEPROM 114 during the power-on sequence prior to the operating system load. Instead, buffer 120 remains accessible for writes from a management entity which runs under the operating system on data processing system 102, such as, for data processing systems including Intel-compatible processors, the system management interrupt (SMI) memory space 124.

The SMI memory space 124 typically contains code and data needed for low level, operating system independent system control functions, and uses a method to authenticate that the calling program which is requesting permission to place data in SMI memory space is a trusted entity (the BIOS startup routine qualifies as such a trusted entity). For other types of processors, a similar restricted memory space which is invisible to the operating system and programs running on top of the operating system may be employed.

The management entity running under the operating system is capable of building a request for change to the critical security information contained in lockable EEPROM device 114, and may be triggered for this purpose by a remote entity. The management entity builds a request for change, then authenticates the request by appending the current administrator password (obtained from the remote entity) and generates a hash utilizing both the request buffer contents and the administrator password. The hash may be generated within the remote entity to avoid the need for transmitting the administrator password from the remote entity to the remotely managed data processing system 102.

During initial power-on (commonly referred to a "power-on, self-test" or "POST") of data processing system 102, a startup routine including a basic input/output system (BIOS) 120 is loaded from nonvolatile memory devices 112 into system memory 110 and executed to configure the various hardware devices within data processing system 102 for operation by loading device drivers and/or setting system parameters, for instance. An operating system is then loaded from nonvolatile storage 116 and started.

Before the operating system is started in the present invention, however, the startup routine checks the non-volatile storage buffer 120 within lockable EEPROM 114 for a change request data structure. If a change request data structure is found within the non-volatile storage buffer 120, the BIOS authenticates the requester by retrieving the current administrator password from lockable memory device 114, appending the password to the request within the non-volatile storage device 120, and generating a hash. If the BIOS generated hash matches the hash appended to the change request within non-volatile storage buffer 120, the requested change is made to the information stored within the lockable memory device 114. If the hash does not match, then a POST error is generated indicating that an unauthorized security information change was attempted.

In the present invention, a security information change request with an authenticating hash based on the current password is stored within a non-volatile storage buffer, which is then locked by the management entity running under the operating system. The next time the system is booted, the BIOS will determine the presence of the request within the buffer and authenticate the requester by independently generating the authenticating hash for comparison with the stored hash. Prior to starting the operating system, however, the lockable memory device 114 is locked down hard to prevent any direct access of the contents by a programming running on the operating system.

With the present invention, a remote entity may authenticate itself to request a change to critical security information, then trigger a system reset within remotely managed data processing system to obtain verification of the requester's entity in a secure fashion and implementation the requested changed. Information indicating how to access the request buffer, together with copies of certain security information, may be included within a system management BIOS (SMBIOS) structure for the management agent's use in building the necessary request. This information will assist remote management tools in performing the function of requesting a change without opening the system to attack.

Figures 2A, 2B:
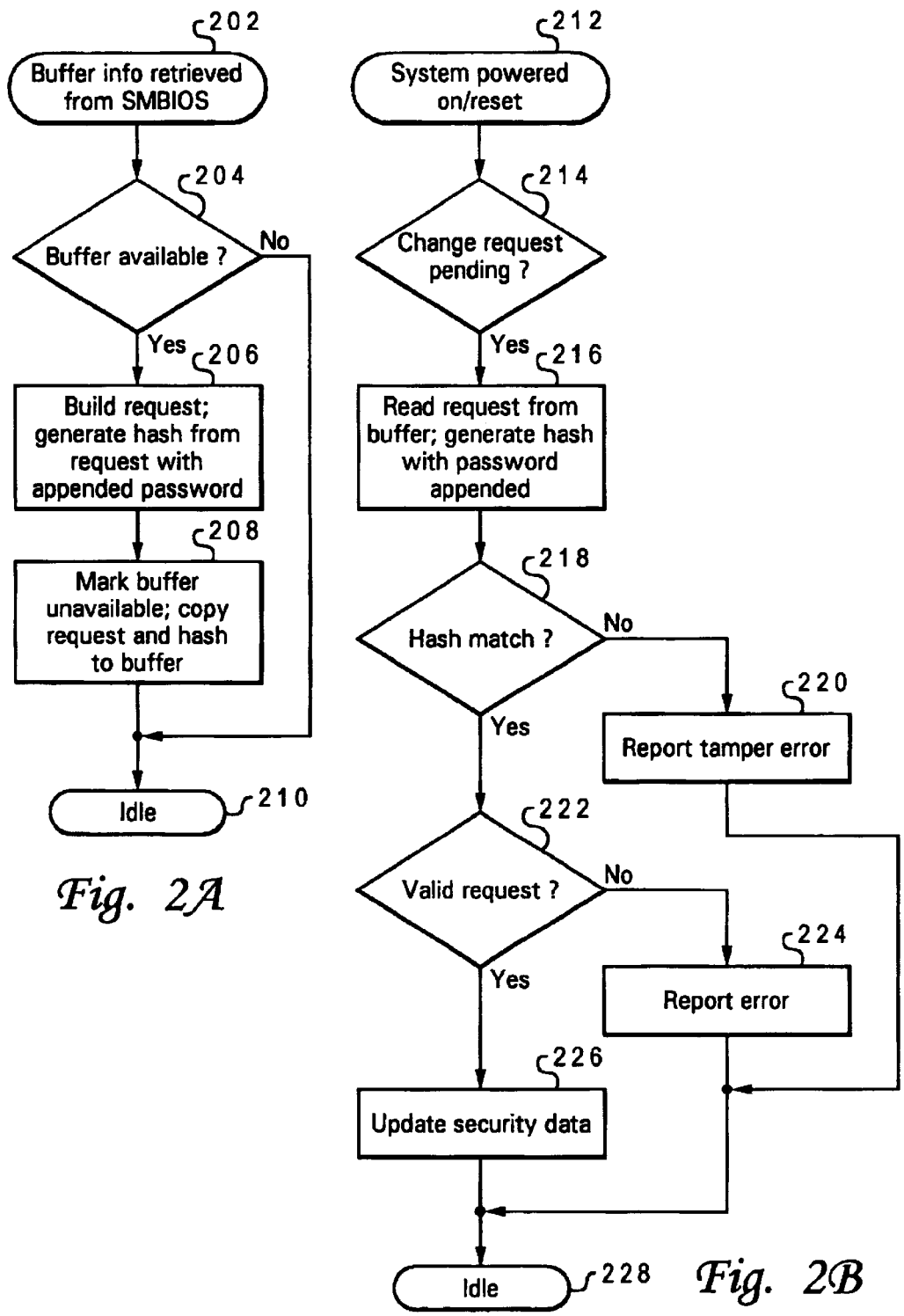
FIGS. 2A–2B are high level flow charts for a process of authenticating a remote entity to securely change critical security information in accordance with a preferred embodiment of the present invention.

With reference now to FIGS. 2A and 2B, high level flow charts for a process of authenticating a remote entity to securely change critical security information in accordance with a preferred embodiment of the present invention are illustrated. The process of FIG. 2A illustrates initiation of a security information change request by a remote entity, and begins at step 202, which depicts information regarding the change request buffer (address location, change request structure, etc.) being retrieved from SMBIOS by the remote entity. The process first passes to step 204, which illustrates a determination of whether the change request buffer is available, or whether the change request buffer already contains a change request. In the exemplary embodiment, only one change request is processed during each POST. Any additional change requests must be deferred until the after the next POST. Alternatively, a buffer sized to hold multiple change requests could be implemented.

If the change request buffer is available, the process proceeds to step 206, which illustrates the remote entity build a change request and generating an authentication hash from the change request with the current password appended. The hash may be generated within the remote entity, prompting the user of the remote entity for entry of the current password, so that the password need not be transmitted between the remote entity and the remotely managed data processing system. The process next passes to step 208, which illustrates the change request buffer being marked unavailable by the system management entity running under the operating system in the remotely managed data processing system, and then the change request structure, together with the generated hash (but not the password) being copied into the change request buffer. The change request buffer is then hard-locked against further access until the next POST. The process then passes to step 210, which depicts the process becoming idle until another change request is initiated.

FIG. 2B illustrates a BIOS process of acting upon a change request, including authenticating the requester and implementing the requested change, and begins with step 212, which illustrates the remotely managed data processing system being power on or reset. The process passes first to step 214, which depicts a determination during the power on sequence, prior to initiating the operating system load, of whether a change request is currently pending. This may be determined from whether the (non-volatile storage) change request buffer was previously marked unavailable and/or contains a data structure.

If a change request is pending, the process first passes to step 216, which illustrates (after unlocking the change request buffer) reading the request from the buffer, and generating a hash from the change request with the current password—retrieved by the BIOS from the unlocked lockable memory device containing the critical security information—appended. The process next passes to step 218, which depicts a determination of whether the hash within the change request buffer matches the hash generated by the BIOS from the change request and the current password. If not, the process proceeds to step 220, which illustrates reporting a tamper error indicating that an unauthorized attempt to change the security information was detected.

If the hashes match, the process proceeds instead to step 222, which illustrates a determination of whether the change request is valid (e.g., properly built and capable of being implemented). If not, the process proceeds to step 224, which depicts reporting an error. If so, however, the process proceeds instead to step 226, which illustrates updating the security data within the lockable memory device. The process then proceeds to step 228, which depicts the process becoming idle until the next time the remotely managed data processing system is booted. The lockable memory device is hard-locked prior to completion of the POST, before loading of the operating system is initiated.

The present invention enables authentication of a remote entity to allow changes by the remote entity to hard-locked security information without compromising security, closing the current void between remote manageability and security. While current system can offer only one or the other, the present invention allows a secure client to be remotely managed, even to changing the critical security information such as password, Boot sequence, etc.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of updating security information, comprising:

during a POST and prior to loading an operating system for a data processing system, checking a non-volatile buffer within the data processing system which may be selectively hard-locked, requiring a system reset to unlock;

responsive to detecting a change request within the non-volatile buffer, generating a hash from the change request with a current password appended, wherein the current password is retrieved from security information stored within a lockable memory device accessible only during the POST of the data processing system and hard-locked prior to loading the operating system; and responsive to determining that the hash generated from the change request with the current password appended matches a hash within the non-volatile buffer, updating the security information within the lockable memory device according to the change request.

2. The method of claim 1, further comprising:

hard-locking the lockable memory device prior to loading the operating system.

3. The method of claim 1, further comprising:

reading the change request, retrieving the current password, and generating the hash utilizing a system BIOS for the data processing system.

4. The method of claim 1, further comprising:

responsive to determining that the hash generated from the change request with the current password appended does not match the hash within the non-volatile buffer, signaling a tamper error indicating an unauthorized attempt to alter the security information within the lockable memory device.

5. The method of claim 1, further comprising:

building the change request and generating the hash within the non-volatile buffer utilizing the change request and a password received from a remote entity seeking to change the security information within the lockable memory device;

storing the change request and the hash within the non-volatile buffer; and after storing the change request and the hash within the non-volatile buffer, hard-locking the non-volatile buffer.

6. The method of claim 5, further comprising:

transmitting only the change request and the hash between the remote entity and the data processing system.

7. The method of claim 5, further comprising:

providing the remote entity with information necessary to build the change request and generate the hash.

8. A system for updating security information, comprising:

means for checking a non-volatile buffer within a data processing system which may be selectively hard-locked, requiring a system reset to unlock, during a POST and prior to loading an operating system for the data processing system;

means, responsive to detecting a change request within the non-volatile buffer, for generating a hash from the change request with a current password appended, wherein the current password is retrieved from security information stored within a lockable memory device accessible only during the POST of the data processing system and hard-locked prior to loading the operating system; and means, responsive to determining that the hash generated from the change request with the current password appended matches a hash within the non-volatile buffer, for updating the security information within the lockable memory device according to the change request.

9. The system of claim 8, further comprising:

means for hard-locking the lockable memory device prior to loading the operating system.

10. The system of claim 8, further comprising:

means for reading the change request, retrieving the current password, and generating the hash utilizing a system BIOS for the data processing system.

11. The system of claim 8, further comprising:

means, responsive to determining that the hash generated from the change request with the current password appended does not match the hash within the nonvolatile buffer, for signaling a tamper error indicating an unauthorized attempt to alter the security information within the lockable memory device.

12. The system of claim 8, further comprising:

means for building the change request and generating the hash within the non-volatile buffer utilizing the change request and a password received from a remote entity seeking to change the security information within the lockable memory device;

means for storing the change request and the hash within the non-volatile buffer; and means for hard-locking the non-volatile buffer after storing the change request and the hash within the non-volatile buffer.

13. The system of claim 12, further comprising:

means for transmitting only the change request and the hash between the remote entity and the data processing system.

14. The system of claim 12, further comprising:

means for providing the remote entity with information necessary to build the change request and generate the hash.

15. A computer program product within a computer usable medium for updating security information, comprising:

instructions for checking a non-volatile buffer within a data processing system which may be selectively hard-locked, requiring a system reset to unlock, during a POST and prior to loading an operating system for the data processing system;

instructions, responsive to detecting a change request within the non-volatile buffer, for generating a hash from the change request with a current password appended, wherein the current password is retrieved from security information stored within a lockable memory device accessible only during the POST of the data processing system and hard-locked prior to loading the operating system; and instructions, responsive to determining that the hash generated from the change request with the current password appended matches a hash within the non-volatile buffer, for updating the security information within the lockable memory device according to the change request.

16. The computer program product of claim 15, further comprising:

instructions for hard-locking the lockable memory device prior to loading the operating system.

17. The computer program product of claim 15, further comprising:

instructions for reading the change request, retrieving the current password, and generating the hash utilizing a system BIOS for the data processing system.

18. The computer program product of claim 15, further comprising:

instructions, responsive to determining that the hash generated from the change request with the current password appended does not match the hash within the non-volatile buffer, for signaling a tamper error indicating an unauthorized attempt to alter the security information within the lockable memory device.

19. The computer program product of claim 15, further comprising:

instructions for building the change request and generating the hash within the non-volatile buffer utilizing the change request and a password received from a remote entity seeking to change the security information within the lockable memory device;

instructions for storing the change request and the hash within the non-volatile buffer; and instructions for hard-locking the non-volatile buffer after storing the change request and the hash within the non-volatile buffer.

20. The computer program product of claim 19, further comprising:

instructions for transmitting only the change request and the hash between the remote entity and the data processing system.

21. The computer program product of claim 19, further comprising:

instructions for providing the remote entity with information necessary to build the change request and generate the hash.

* * * * *